United States Patent [19]

Göras et al.

[11] Patent Number: 5,775,296
[45] Date of Patent: Jul. 7, 1998

[54] ARRANGEMENT AND METHOD FOR CONFIGURATION OF DISTRIBUTED COMPUTER NETWORKS IMPLEMENTED IN MULTI CYLINDER COMBUSTION ENGINES

[75] Inventors: Anders J. Göras; Bo F. Nilson Almstedt; Cunnar L. C. Björquist, all of Åmål, Sweden

[73] Assignee: Mecel AB, Sweden

[21] Appl. No.: 640,888

[22] PCT Filed: Sep. 8, 1995

[86] PCT No.: PCT/SE95/01014

§ 371 Date: Aug. 8, 1996

§ 102(e) Date: Aug. 8, 1996

[87] PCT Pub. No.: WO96/07819

PCT Pub. Date: Mar. 14, 1996

[30] Foreign Application Priority Data

Sep. 11, 1994 [SE] Sweden ............................ 9403048

[51] Int. Cl.[6] .......................... F02D 41/26; G06F 15/16
[52] U.S. Cl. ...................... 123/417; 123/480; 701/104; 701/105; 364/133
[58] Field of Search ........................ 123/417, 480; 364/133, 134, 431.051, 431.052, 431.053, 431.12

[56] References Cited

U.S. PATENT DOCUMENTS

| | | |
|---|---|---|
| 4,841,450 | 6/1989 | Fredriksson ................ 364/468.19 |
| 4,884,204 | 11/1989 | Seibt et al. ................ 364/431.03 |
| 5,001,642 | 3/1991 | Botzenhardt et al. ........ 364/431.12 |
| 5,267,542 | 12/1993 | Keskula ...................... 123/480 X |
| 5,339,782 | 8/1994 | Golzer et al. .............. 123/480 X |
| 5,444,626 | 8/1995 | Schenk ...................... 123/480 X |
| 5,454,095 | 9/1995 | Kraemer et al. ............ 364/431.052 |

FOREIGN PATENT DOCUMENTS 3433778 2/1992 Germany.

*Primary Examiner*—Tony M. Argenbright
*Attorney, Agent, or Firm*—Ostrolenk, Faber, Gerb & Soffen, LLP

[57] ABSTRACT

An arrangement and a method for configuration of a combustion engine control system, the control system including a distributed computer network having a main computer ECU and a number of node computers, CCU 1/CCU 2/CCU 3. Each node computer is arranged closely to a selected group of cylinders (11, 12/13, 14/15, 16) of the combustion engine and controls at least the fuel supply (22) of each respective group of cylinders. The main computer and the node computers are connected to a common communication loop (1) transmitting control data from the main computer to the node computers and information from the node computers to the main computer. By using dual switch devices (30, 31–32/51a–b, 52a–b, 53a–b) at each node computer, the main computer as well as each individual node computer can be configured for the present engine type, and the node computers can be configured for the specific cylinders. The switch device preferably constitutes a number of rotary switches of the BCD-type.

9 Claims, 3 Drawing Sheets

ARRANGEMENT AND METHOD FOR CONFIGURATION OF DISTRIBUTED COMPUTER NETWORKS IMPLEMENTED IN MULTI CYLINDER COMBUSTION ENGINES

BACKGROUND OF THE INVENTION

Present invention relates to an arrangement and a method for a combustion engine control system, said control system including a distributed computer network.

PRIOR ART

Computerised control systems of combustion engines often includes a system- or main computer, in motor vehicles conventionally located at the fire wall, which computer controls the ignition system, the fuel supply system or both. If the control system should be implemented in a considerably larger type of combustion engines, such as stationary electric power units or marine engines exceeding 500 hp, a rather extensive wiring are needed. These engines are often produced in relatively small series where the wiring is made manually for each individual engine, which is very time consuming and expensive.

In EP.B.189404 (=U.S. Pat. No. 4,841,450) is shown a system for distributed computer networks where each individual node computer could be configured by the main computer. In this type of system is each node computer configured by soft-ware control at the start of the control system. The concept is that each node computer should be pre-programmed for a number of different operating modes, and that each node computer should be freely interchangeable. At start up the main computer sends digital signals, via a CAN-bus, which signals will configure each node computer. It is also mentioned that the node computers could be configured by a code plug or switching means. The disadvantage is that the main computer will be limited for the intended function, and will not be able to be transferred to other type of systems.

SUMMARY OF THE INVENTION

The main object of the invention is to create a control system for combustion engines including a main computer and a number of node computers, which main computer as well as node computers in an unrestricted manner could be interchanged between different engines, the engines having 4,6,8,9,12,16 or 18 cylinders, and where the node computers of each engine could be interchanged, among themselves.

Another object of the invention as implemented in control systems for combustion engines including a distributed computer network system, is to enable a simple replacement of node computers, which node computers without any sophisticated means could be configured for the intended node function An essential advantage is that each node computer could be configured by a small size screw driver, or automatically when a new substituting computer module is mounted in the node housing, which will facilitate replacement of a malfunctioning computer module of a node computer.

In larger combustion engines used in stationary electric power plants or as a propulsion unit for ships, it is essential that malfunctioning node computers could be replaced quickly on site, without needing any special equipment for the configuration of replacing node computers.

Another object of a first embodiment is that the configuration of the node computers will be made according a logical manner for each individual engine, where the engine operator only have to know the number of cylinders of the engine in question, and which node computer which should be replaced.

Another object of a second embodiment is that the configuration will be made automatically when the computer module of a node computer is replaced. The configuration of the node number and the total number of cylinders of the engine will then be made once and for all in a lower bottom part of a node housing preferably mounted stationary at the engine. The computer module of the node computer being integrated into a upper lid which could be mounted in the lower bottom pan.

Yet another object is to obtain in a simple manner a double check of the proper configuration of each node computer, as to the correct setting of each node computer of the type of engine used and that the amount of node computers required for the engine have been installed and configured.

This type of configuration of the node computers will also configure the main computer to the present number of cylinders of the engine. The main computer will read the setting of each node computer as to the number of cylinders of the engine, and will be configured to control a engine having a number of cylinders as indicated in consensus by the node computers.

Yet another object is that the start of the combustion engine will be blocked if the node computers are configured incorrectly, i.e. if any of the node computers is configured incorrectly.

Yet another object is that one and the same node computer could be manufactured, programmed and place in stock for a number of engine sizes and for all nodes in each respective type of engine. The node computers will then include a number of stored control functions suitable for example for 6,8,12 or 16 cylinder engines. Each node computer being designed to control at least the fuel supply to a cylinder croup having a predetermined number of cylinders. The number of cylinders within each cylinder group preferably being two, whereby each node computer could be implemented in combustion engines where the total number of cylinders are evenly divisible by a factor two. For example in a in-line 6-cylinder engine are 3 node computers used, in a 8-cylinder combustion engine are 4 node computers used, etc. In this manner could the number of variants of node computers be reduced. In certain type of applications could the variants be minimised to only one variant for 4,6,8,9, 12,16 as well as 18 cylinder combustion engines, which will reduce the cost of the system.

An operator of the combustion engine could then have only one or a small number of node computers in stock for each engine. If different types of engines is used by the operator, then the same node computer could be used for all engines, irrespective of the engine being a 6,8,12 or 16 cylinder engine. An operator could then have only a limited number of node computers in a common stock, and close to each engine store only one or two node computers in order to enable a rapid replacement of a faulty node computer.

The foregoing and other objects of the invention are achieved in accordance with the present invention by a control system in which the main computer and the node computers are connected to a common communication loop which transmits control data from the main computer to the node computers and information from the node computers to the main computer. A first switch means is arranged at each node computer for setting the node number during installation of the node computer. A second switching means is arranged at each node computer for setting the total number of cylinders of the combustion engine. The main computer has a number of start programs each of which is used for generating basic control data in the form of fuel amount and/or ignition timing for a specific engine type. Each node computer includes a memory containing cylinder individual relation data for every cylinder of each specific engine type stored in the main computer.

Other features and advantages of the present invention will become apparent from the following description of the invention which refers to the accompanying drawings.

DESCRIPTION OF EMBODIMENTS

Figure 1:
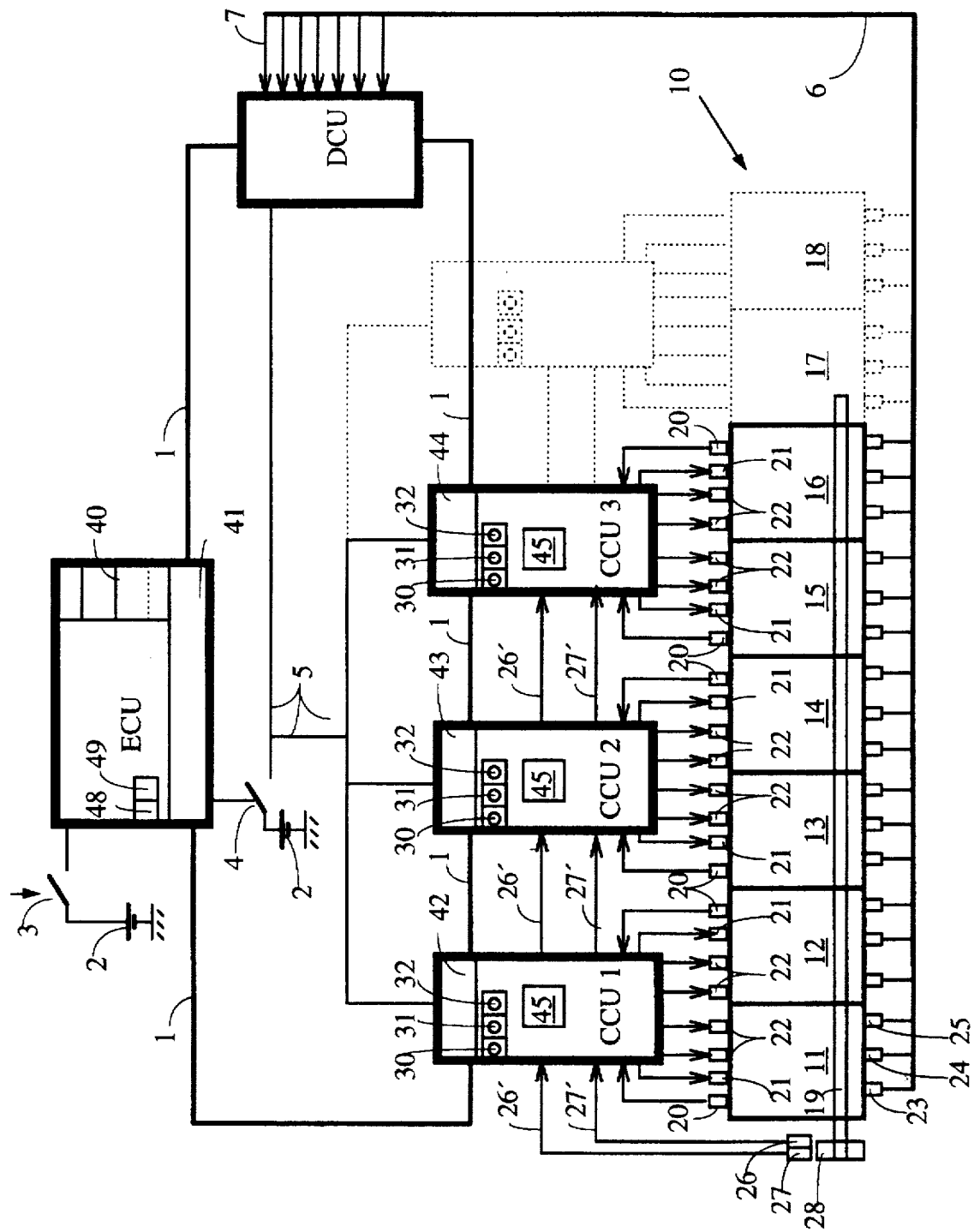
FIG. 1 shows schematically a control system for a combustion engine having a distributed computer network.

In FIG. 1 is shown an arrangement for a control system for a multi cylinder combustion engine 10. The combustion engine shown in the figure having six cylinders 11–16, but the invention could advantageously be used for combustion engines having even further cylinders, as indicated by the dot-marked cylinders 17–18, for example in total 8,12,16 or 18 cylinders. There is at least one fuel injector 22 for each cylinder, but for the engine shown two injectors 22 are used for each cylinder. One of the injectors is supplying fuel to a pre-combustion chamber and the other injector is supplying fuel to the main combustion chamber. In the combustion engine shown there is also a spark plug 21 mounted in the cylinder in order to ignite the air-fuel mixture supplied.

The spark plug could be excluded if the combustion engine is a Diesel engine where the fuel is subject to self-ignition. The combustion engine could thus be operating with fuels such as petrol(gasoline), diesel, natural gas or any other gas.

In order to reduce the number of electric wires in the control system a distributed computer system including a number of node computers (Cylinder Control Units) CCU 1/CCU 2/CCU 3, hereafter designated as CCU's, distributed on the combustion engine. Each one of the node computers CCU 1/CCU 2/CCU 3 serving a part of the cylinders of the combustion engine. The distributed computer system also includes a communication loop 1, in form of a CAN-bus, installed at the engine such that the node computers CCU 1/CCU 2/CCU 3 are connected in series.

By using a CAN-bus, several additional equipment could be connected to the CAN-bus, for example different Data Collection Units (DCU), hereafter designated as DCU's, which in turn collects different detected engine parameters not being representative for an individual cylinder. The DCU's are collecting a number of parameters which are monitored from a safety point of view, and for controlling different supporting units such as a supercharging unit. For this object are a number of sensors mounted on the engine, including crankshaft bearing temperature sensor 23, oil pressure sensor 24, coolant fluid temperature sensor etc., which sensors via wiring 6 transmits the corresponding individual values to the data inputs 7 of the DCU. As many as 6 DCU's could be mounted at an engine having 18 cylinders, each DCU being capable of collecting up to 30 different engine parameter values. Each DCU could collect analogue measuring values and convert these values to a digital representation, i.e. an A/D conversion. The DCU also includes a communication interface being able to transmit these converted values at the CAN-bus. The DCU's have a comparatively slow update of collected values or transmits the information at low transmission frequency at the CAN-bus, on the order of 1 Hertz, whereby parameters which adjust the amount of fuel or the ignition timing between successive combustion's not could be collected by the DCU's.

A main computer (Engine Control Unit), hereafter designated as ECU, is connected to the CAN-bus, thereby being able to read the engine parameters detected by the data collecting units DCU's and each CCU. Control algorithms are stored in the ECU, as well as fuel—and ignition timing maps, necessary for controlling the amount of fuel supplied and the ignition timing. On the basis of the detected parameters of the engine will the ECU send signals on the CAN-bus corresponding to the basic fuel amount and basic ignition timing needed for the present conditions.

For an individual correction of each cylinder of the basic fuel amount and ignition timing, each CCU receives a cylinder specific information from a temperature sensor 20 arranged in each cylinder or in the individual exhaust channel from each cylinder. The cylinder temperature value is sent to the ECU via the CAN-bus, in order to calculate any possible corrective values for each cylinder. If by way of example the temperature becomes excessively high, then a corrective fuel enrichment value could be sent to the respective CCU in question. The fuel enrichment is initiated in order to cool down the combustion. The ECU is consequently sending all basic control data valid for all cylinders regarding fuel amount and ignition timing, followed by any cylinder individual correction value thereof. If by way of example the load increases, then the basic control data changes but the cylinder individual correction value or offset value remain unchanged.

The ECU monitors the load of the combustion engine, either directly or via a DCU, and will determine the basic fuel amount and basic ignition timing valid for all cylinders. The load could for example in a electric power unit be represented by the electric load of a generator driven by the combustion engine. The synchronisation of the fuel—and ignition timing is managed entirely by each CCU on the basis of input data from a camshaft sensor 26,27. The camshaft sensor is preferably designed to include two different sensors capable of detecting teeth upon a code disc which is co-rotating with the camshaft The sensors generates two different types of pulse train, such that one sensor 26 generates one or two pulses per camshaft revolution and the other sensor 27 generates a couple of hundreds of pulses per camshaft revolution. The sensor 26 is then used in order to determine a specific phase position in the work cycle of the combustion engine, where the pulse preferably is generated when one or several pistons is located close to the lower or upper dead position. The sensor 27 is used to determine the motor speed, or by using dead reckoning for determination of synchronous events for injection- or ignition timing during one revolution of the camshaft- or the crankshaft. The sensors 26 and 27 are sending the pulses at wires 26' and 27', which wires are drawn through each CCU and thus readable by each CCU. In order for the ECU to be able to determine the basic fuel amount and ignition timing, is the motor speed signal also sent via the CAN-bus.

The temperature sensor 20 is used by each CCU in order to monitor the combustion process, on one hand for the correction of the fuel amount and on the other hand to be able to detect whether or not a combustion have occurred within the cylinder. Other types of cylinder sensors could also be used and connected to each CCU, in order to monitor the combustion process and to optimise the combustion within each cylinder. Such sensors could for example be a pressure sensor or ionisation sensor, having a pressure transducer respectively a measuring gap arranged within the combustion chamber. At start up of the control system is the ECU connected to a voltage source 2 via a switch 3. The ECU thereafter activates a relay 4, which connects the DCU and at least the driver stages of the CCU's to the voltage source. Each CCU is preferably divided into one separated drive stage and a separated micro processor based control unit, and the switch 3 could then also connect the control unit of each CCU to the voltage source.

Figure 2:
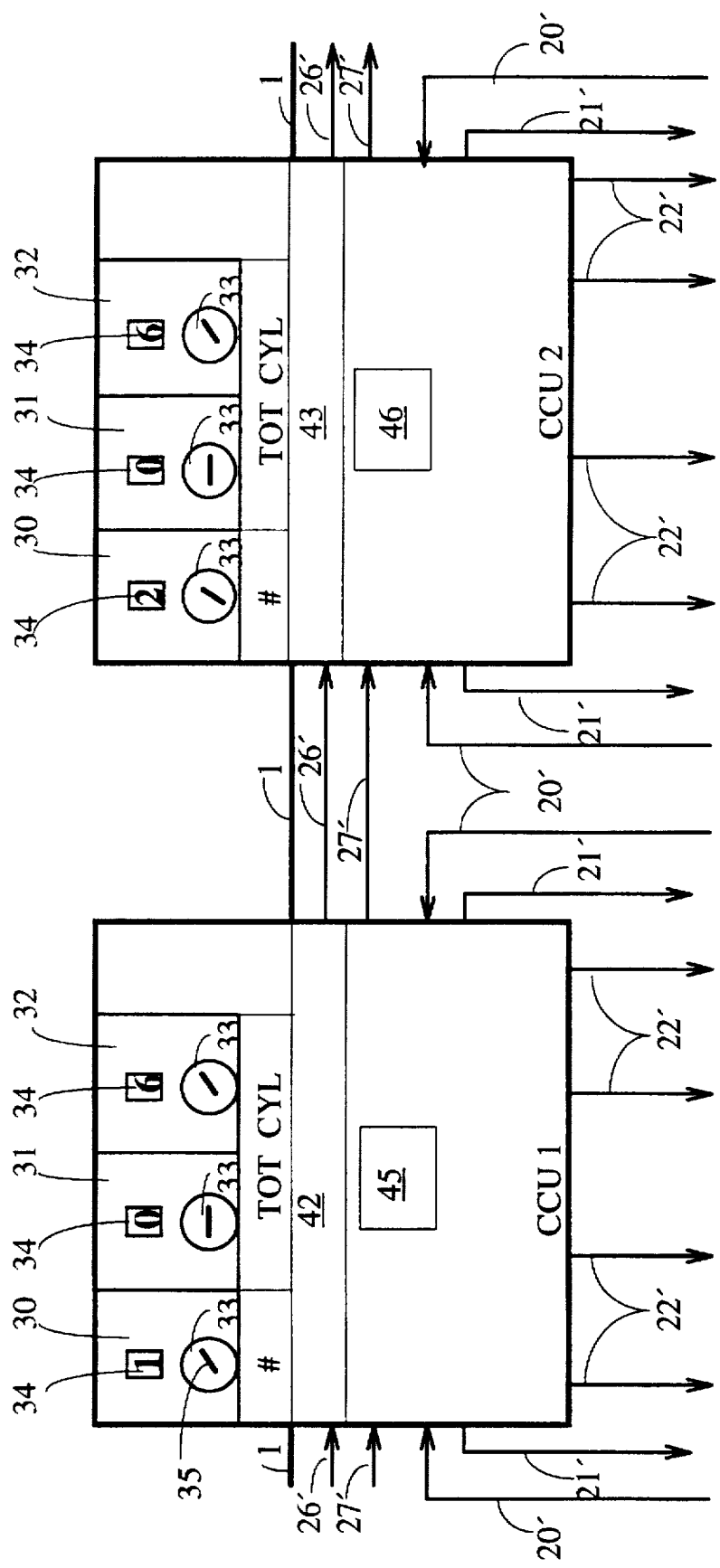
FIG. 2 shows the node computers included in the distributed computer network.

At start up is the switch position of the switch means 30–32 within each CCU read by the CCU. As could be seen in FIG. 2 are these switch means 30–32 constituted of rotary switches 33, preferably of the BCD-type(Binary Coded Data). Said BCD-switches are sending a binary 4-bit representation of values between 0–9. The BCD-switches are in an conventional manner equipped with a groove 35 suitable for a small screwdriver, by which the BCD-switch could be set to different discrete positions from 0–9. The BCD-switch is commonly provided with markings numbered from 0–9 around the set screw, but in the figure is this only shown by the indicator window 34 showing the present set position. The BCD switches are arranged as two functionally operating switch means, where the first switch means "#" includes one BCD-switch 30, and the second switch means "TOT CYL" includes two BCD-switches 31,32.

With the first switch means 30 is the present node number set for the node in question In FIG. 2 is the switch means 30 set to "1" for CCU 1 and set to "2" for CCU 2 etc. With the second switch means 31,32 is the total number of cylinders in the combustion engine set. The node computers in FIG. 2 are set for a six cylinder engine, and the first BCD-switch of the second switch means, indicating tens, is set to "0" and the second BCD-switch of the second switch means is set to "6". With a set-up of BCD-switches as shown in FIG. 2, a control system, having each node computer controlling two cylinders, be set for a combustion engine having as much as 18 cylinders. This is the upper limit due to that the first switch means limit the set-range, i.e. could be set to 9 units of node computers.

As an alternative to BCD-switches could instead HEX-switches be used, using all four bits such that the set range for each switch constitute discrete steps from 1 to 16. The first switch means could hence be a HEX-switch with two BCD-switches in the second switch means. In this manner could a control system, where each node computer is controlling two cylinders, be set for a combustion engine having as much as 32 cylinders.

The BCD-switches are however the preferred choice, especially if the largest size of the engine is a 18-cylinder engine.

In an embodiment not shown could yet another switch be used in order to set possible variants, for example variants of six-cylinder engines. As an alternative to the BCD-switch shown, could instead a DIP-switch be used, where each individual bit of the binary 4-bit code must be set to the desirable position. This variant is however less attractive due to that the person who should install or replace a node computer needs to be familiar with a binary representation of numbers, or needs a detailed instruction for setting the DIP-switches in the proper position.

After the CCU's having read the position of the switch means is a control initiated from the ECU. The ECU make an inquiry via the CAN-bus about the configuration of each node computer. When the first node computer is checked will the ECU receive a first information regarding the present number of cylinders from the setting of the second switch means. The ECU will then control whether or not the set number of cylinders correspond to a allowable defined type of engine. If this is not the case, then the ECU will be blocked and thus automatically preventing any start of the engine.

The ECU will thereafter request configuration data from the remaining node computers, for a number of nodes given by the present number of cylinders or for a number of nodes corresponding to the largest defined type of engine (for example a 18-cylinder engine). When all configuration data have been received, then a check is made if all nodes have one and the same setting as of the present engine size. Thereafter is checked if the necessary number of nodes for the present engine size have responded.

If every node computer have the same understanding/setting of the engine size, then the ECU will be configured for this size of engine. If on the other hand some of the node computers have a deviant understanding-setting, then will the ECU automatically be blocked preventing engine start.

If the necessary number of nodes for the present type of engine have responded, for example six node computers having the order number from 1 to 6 have responded in a 12-cylinder engine, then the ECU is initiated to allow engine start, if not other checks have blocked an engine start. If for example two node computers have been set at the same order number, then a response from one node computer will be missing. The engine should then not be allowed to be started, due to that one of the node computers would synchronise fuel injection and/or ignition at incorrect timing for two cylinders, which could be damaging to the engine if the engine starts at all.

In this manner will the ECU be configured when the configuration of the node computers is made. The ECU will adapt the control and the communication signalling at the CAN-bus for the present size of engine, and pre-stored programs for all cylinders of all engine sizes are present in each CCU. The CCU will for a six-cylinder engine contain information relevant to the occurrence of the lower and upper dead positions of the pistons in relation to certain positions of the crankshaft (determined from the camshaft sensor) for the cylinders 1–6. In the same manner will the corresponding positions for the lower and upper dead positions of the pistons of other engine sizes be stored. Any extensive memory capacity not used do not have to be present in the CCU's, since only the relative position of the lower and upper dead position for each cylinder and engine size is needed.

Figure 3:
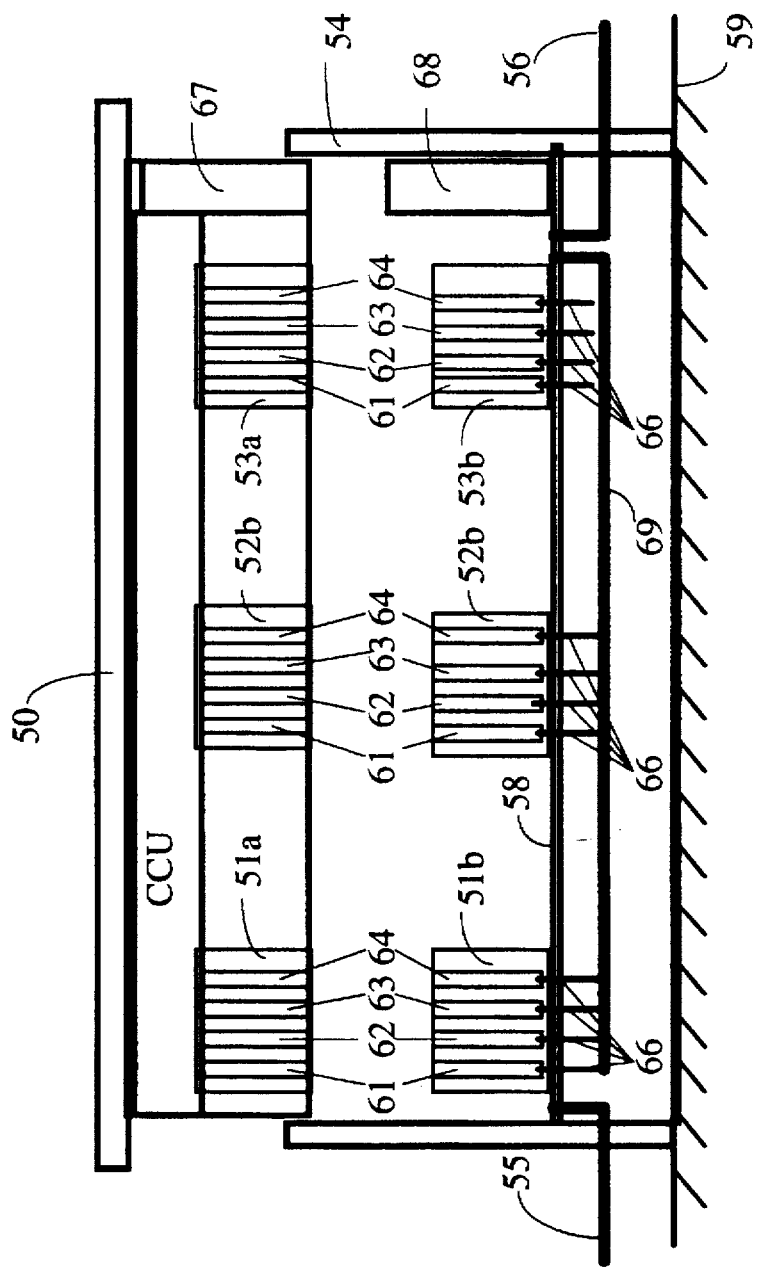
FIG. 3 shows a further developed variant having switching means integrated in the housing of the node computer.

In a further developed embodiment, shown in FIG. 3, an automatic configuration of the node computer and main computer will be obtained, by using a specific design of the housing of the node computer. In this case will the housing of the node computer consist of a lid 50 and a bottom part 54. Said bottom part 54 having extended side walls on top of which the lid is mounted. The CCU is integrated with the lid 50 and the bottom part 54 only contains a connection board 58. The Can-bus, the different input- and output wires 20',21',22',26',27' and the power supply line 5 are connected to the connection board, schematically indicated by the input- and output cable harnesses 55 and 56 respectively. Due to that the bottom part only contains mechanical components, electric conductors etc., could this bottom part be mounted permanently on a stationary part 59 of the engine. If the node computer is damaged, then only the lid with the integrated CCU needs to be replaced. The connection between the lid/CCU and the connection board 58 is made via a female connector 67 integrated in the lid and a male connector 68 at the connection board (or vice versa: male connector in lid and female connector in the bottom part). The configuration of the node computer is obtained by switch means 51,52,53 integrated in the lid in the form of contacts 51a, 52a, 53a and with these contacts co-operating contacts 51b, 52b, 53b integrated in the bottom part 54. Each contact includes a number of connectors 61,62,63,64 corresponding to the 4-bit code of the BCD-switch. The connectors 61–64 of the connection board 58 could be connected to the power supply via breakable members 66. By breaking one or several of the members 66 could a code corresponding to the BCD-code be set and transmitted to the node computer in the lid 50. The setting of the code contacts 51b, 52b, 53b of the bottom part 54 is made once, and will then form a permanent setting. This setting do not have to be altered as long as the bottom part do not need to be replaced. Replacement of the bottom part is rarely needed if this part only includes fixed electric conductors. The members 66 could by way of example be broken by prizing these by means of a small screwdriver. In an alternative embodiment to the members 66 could certain gates be burnt away electrically when a semiconductor type of gate array is used. This solution avoids manual setting of the switching means. In a corresponding manner as to the BCD-switches could the first switch means for the order number of the node computer consist of a first contact 51a/51b, and the second switch means for the total number of cylinders consists of the contacts 52a/52b and 53a/53b.

The invention is preferably implemented when manufacturing modularised combustion engines, where the cylinders of the combustion engine are identical irrespective of if these engines are a 6-, 8-, 12-, 16- or 18-cylinder type of engine. The specific size of engine is manufactured by simply adding a number of identical cylinders together. The programming of the ECU will thus be very simple, due to that the basic fuel amounts calculated will be the same for each cylinder. The number of cylinders to be controlled by the ECU will be given by the second switch means of the CCU's. The ECU thus obtains a simple configuration of the size of the engine, a 6-, 8-, 12-, 16-, or 18-cylinder engine, by the configuration of the CCU.

This modularised manufacturing design is advantageously used for larger types of engines manufactured in small limited series, where each combustion engine should be adjustable to different demands in aspect of power output, by assembling the necessary amount of cylinders.

In one embodiment, not shown, could the code contacts instead consist of a physical embossing or a drilled code picture at the surface of the combustion engine, upon which surface the node computer is mounted. The embossing or the drilled code picture could then be detected by sensors incorporated in the housing of the node computer.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A control system for a combustion engine having a plurality of cylinders, each of which has associated fuel supply means, which control system comprises:

a distributed computer network having a main computer and a number of node computers, each respective node computer being arranged closely to a selected group of the cylinders of the combustion engine and controlling at least the fuel supply means of the cylinders of said group, the main computer and the node computers being connected to a common communication loop transmitting control data from the main computer to the node computers and information from the node computers to the main computer;

a first switch means arranged at each node computer for setting a node number during installation of the node computer;

a second switch means arranged at each node computer for setting the total number of cylinders of the combustion engine; and the main computer having a number of stored programs, each program used for generating basic control data in the form of at least one of fuel amount and ignition timing for a specific engine type, each node computer including a memory containing cylinder individual relation data for every cylinder of each specific engine type stored in the main computer.

2. A control system according to claim 1, wherein each node computer includes a communication interface and a switch for connecting the communication interface to a voltage supply, the node computer communication interface transmitting values to the main computer via the communication loop representative of the detected positions of the first and second switch means of the node computer, and wherein the main computer includes a communication interface for detecting the values transmitted via the communication loop representative of the setting of the first and second switch means of each respective node computer, the representative values from the first switch means being supplied to a first comparator included in the main computer which detects if the respective values from the first switch means of the node computers have unique values, and the representative values from the second switch means being supplied to a second comparator included in the main computer which detects if the respective values from the second switch means have identical values.

3. A control system according to claim 2, wherein each of the first and second switch means comprises rotary switches of the BCD-type, which switches in discrete steps generate a digital 4-bit representation of an integer.

4. A control system according to claim 3, wherein in the first switch means the integer represents the order number of the node computer.

5. A control system according to claim 3, wherein in the second switch means the integer represents the total number of cylinders of the combustion engine.

6. A control system according to claim 3, wherein the first and second switch means of each node computer comprise permanently configurable code contacts which are a part of a housing for the node computer mounted in a fixed manner to a stationary part of the engine, the node computer being integrated in a lid which is mountable at the node computer housing, said lid including connecting contacts corresponding to and, when the lid is assembled to the node computer housing, cooperating with the code contacts for transmitting the setting of the code contacts at the stationary housing part to the node computer in the lid.

7. Method for configuring a combustion engine control system, which control system includes a distributed computer network having a main computer and a number of node computers, each respective node computer being arranged closely to a selected group of cylinders of the combustion engine and controlling fuel supply means of the cylinders of said group, and where the main computer and the node computers are connected to a common communication loop transmitting control data from the main computer to the node computers and information from the node computers to the main computer, which method comprises the steps of:

during installation of a node computer, manually setting a first switch means located in the node computer to a position corresponding to the total number of cylinders of the combustion engine and manually setting a second switch means located in the node computer to a position corresponding to an order number of the node computer; and during start up of the engine, causing the main computer to check that each node computer has a similar setting of the first switch means, which corresponds to the node computers having the same interpretation of the type of engine, and that each node computer has a unique setting of the second switch means indicating that the number of nodes required for the combustion engine have been installed, whereby the main computer is configured for the present type of engine and the node computers are configured for the engine type and the cylinders for which the present engine type corresponds to the order number of the node computer.

8. Method according to claim 7, wherein if every node computer does not have an identical setting of the first switch means, which identical setting corresponds to the node computers having the same interpretation of the type of engine, then the main computer is prevented from starting the engine.

9. Method according to claim 7, wherein if every node computer does not have a unique setting of the second switch means or if the number of node computers required for the combustion engine have not been installed, then the main computer is prevented from starting the engine.

* * * * *